(12) United States Patent
Karagkioules et al.

(10) Patent No.: US 11,206,295 B1
(45) Date of Patent: Dec. 21, 2021

(54) SYSTEM AND METHOD FOR STREAMING CONTENT SELECTION

(71) Applicant: CodeShop, B.V., Amsterdam (NL)

(72) Inventors: Theodoros Karagkioules, The Hague (NL); Arjen Wagenaar, Amsterdam (NL); Dirk Griffioen, Arnhem (NL); Rufael Negatu Mekuria, Amsterdam (NL)

(73) Assignee: CodeShop, B.V., Amsterdam (NL)

( * ) Notice: Subject to any disclaimer, the term of this patent is extended or adjusted under 35 U.S.C. 154(b) by 0 days.

(21) Appl. No.: 16/931,116

(22) Filed: Jul. 16, 2020

(51) Int. Cl.
*H04L 29/06* (2006.01)

(52) U.S. Cl.
CPC ...... *H04L 65/4076* (2013.01); *H04L 65/4084* (2013.01); *H04L 65/607* (2013.01); *H04L 65/608* (2013.01)

(58) Field of Classification Search
CPC ............... H04L 65/4076; H04L 65/608; H04L 65/4084; H04L 65/607; H04L 29/06
USPC ................................ 709/231, 230; 370/465
See application file for complete search history.

(56) References Cited

U.S. PATENT DOCUMENTS

| | | | |
|---|---|---|---|
| 191,799 | A | 6/1877 | Emery |
| 8,924,580 | B2 | 12/2014 | Begen et al. |
| 9,237,387 | B2 | 1/2016 | Bocharov et al. |
| 9,386,308 | B2 | 7/2016 | Li et al. |
| 10,271,112 | B2 | 4/2019 | Xiaoqi et al. |
| 10,362,080 | B2 | 7/2019 | Sen et al. |
| 10,439,910 | B2 | 10/2019 | Koster et al. |

(Continued)

FOREIGN PATENT DOCUMENTS

| | | |
|---|---|---|
| EP | 2700240 | 11/2019 |
| WO | WO 2014/046852 | 3/2014 |

OTHER PUBLICATIONS

Theo Karagkioules, Rufael Mekuria, Dirk Griffioen, and Arjen Wagenaar. 2020. Online learning for low-latency adaptive streaming. In Proceedings of the 11th ACM Multimedia Systems Conference (MMSys '20). Association for Computing Machinery, New York, NY, USA, 315-320. DOI:https://doi.org/10.1145/3339825.3397042.

(Continued)

*Primary Examiner* — Tonia L Dollinger
*Assistant Examiner* — Mehulkumar J Shah
(74) *Attorney, Agent, or Firm* — Pablo Meles (57) ABSTRACT

A method for streaming content selection includes reading a media presentation description to identify a content model based on different representations and a plurality of media segments, chosing the media segments for content selection from different representations, adapting the bitrate based on the content model and the different representations, reading, from the one or more memory devices, one or more values associated with the one or more constraint functions, minimizing a third function and yielding a probability distribution of bitrate decisions, and selecting one or more media segments where the difference between the bit-rates and the expectations of the bit-rate decisions distributions is minimal. After requesting, receiving the one or more media segments, storing an achieved download throughput in the one or more memory devices, storing the media segment(s), decoding segment(s) to provide one or more decoded media segments and rendering the one or more decoded media segments.

20 Claims, 4 Drawing Sheets

(56) References Cited

U.S. PATENT DOCUMENTS

| | | | |
|---|---|---|---|
| 10,659,512 B1 | 5/2020 | Nielsen et al. | |
| 2015/0334153 A1* | 11/2015 | Koster | H04L 67/32 709/219 |
| 2017/0188069 A1 | 6/2017 | Mueller et al. | |
| 2019/0037252 A1* | 1/2019 | Wagenaar | H04L 65/602 |
| 2020/0404361 A1* | 12/2020 | Lohmar | H04N 21/44004 |

OTHER PUBLICATIONS

Theodoros Karagkioules and Georgios S. Paschos and Nikolaos Liakopoulos and Attilio Fiandrotti and Dimitrios Tsilimantos and Marco Cagnazzo. Optimizing Adaptive Video Streaming in Mobile Networks via Online Learning. 2019. arXiv 1905.11705.

Liakopoulos Nikolaos and Destounis, Apostolos and Paschos, Georgios and Spyropoulos, Thrasyvoulos and Mertikopoulos, Panayotis. Cautious regret minimization: Online optimization with long-term budget constraints. 2019. In Proc. of ICML.

K. Spiteri, R. Urgaonkar and R. K. Sitaraman, "BOLA: Near-optimal bitrate adaptation for online videos," IEEE INFOCOM 2016—The 35th Annual IEEE International Conference on Computer Communications, San Francisco, CA, 2016, pp. 1-9, doi: 10.1109/INFOCOM.2016.7524428.

Z. Li et al., "Probe and Adapt: Rate Adaptation for HTTP Video Streaming At Scale," in IEEE Journal on Selected Areas in Communications, vol. 32, No. 4, pp. 719-733, Apr. 2014, doi: 10.1109/JSAC.2014.140405.

Te-Yuan Huang, Ramesh Johari, Nick McKeown, Matthew Trunnell, and Mark Watson. 2014. A buffer-based approach to rate adaptation: evidence from a large video streaming service. SIGCOMM Comput. Commun. Rev. 44, 4 (Oct. 2014), 187-198. DOI:https://doi.org/10.1145/2740070.2626296.

A. Bentaleb, B. Taani, A. C. Begen, C. Timmerer and R. Zimmermann, "A Survey on Bitrate Adaptation Schemes for Streaming Media Over HTTP," in IEEE Communications Surveys & Tutorials, vol. 21, No. 1, pp. 562-585, Firstquarter 2019, doi: 10.1109/COMST.2018.2862938.

Kevin Spiteri, Ramesh Sitaraman, and Daniel Sparacio. 2018. From theory to practice: improving bitrate adaptation in the DASH reference player. In Proceedings of the 9th ACM Multimedia Systems Conference (MMSys '18). Association tor Computing Machinery, New York, NY, USA, 123-137. DOI:https://doi.org/10.1145/3204949.3204953.

* cited by examiner

SYSTEM AND METHOD FOR STREAMING CONTENT SELECTION

FIELD

The present disclosure relates to Internet streaming of media, and more particularly in certain embodiments to selection of adaptive streaming content.

BACKGROUND

Media services such as Internet Video streaming services are becoming increasingly popular. Typical Internet video streaming services use streaming protocols such as MPEG DASH defined in ISO/IEC 23009-1 or HTTP Live Streaming HLS published by the Internet Engineering Task Force (IETF) as RFC 8216 or other protocols with similar features. These protocols use the Hyper Text Transfer Protocol (HTTP) as the primary transport protocol and assume that the client is in control of content selection of adaptive bit-rate content. Contrary to traditional broadcasting, a client or receiver makes a content selection out of multiple bit-rate segment representation choices and tracks and initiates data transfers by requesting pieces of a selection of content. Achieving good playback quality in such scenarios is still identified as a challenging problem for the media clients consuming adaptive streaming content, as available bandwidth estimations are needed, and other unknown characteristics need to be induced. Examples of properties to be induced include media content sizes, playback or codec functionalities that are neither known nor stationary. Most importantly, available bandwidth estimations are needed to do effective bit-rate content selection, as the segment bit-rate should not exceed the available bandwidth. This problem is sometimes referred to as bitrate-adaptation and available bandwidth estimation. This field teaches how clients can make intelligent decisions about selection of adaptive streaming content to achieve a smooth presentation and playback. Different playback quality aspects should also be considered when selecting streaming content, such as avoiding stalls (playback interruptions) when insufficient data is available, or, selecting of content of lower quality when instead a higher quality could have been selected.

The Media industry uses many different formats such as those defined by the Moving Picture Experts Group (MPEG) and proprietary ones defined by companies such as Apple®, Microsoft® and Adobe®. Delivery of adaptive streaming content is useful for fitting content to different screen sizes and types, complying to protocol needs and/or matching user preferences. Another standards group that defines protocols for streaming is the Internet Engineering Task Force (IETF) which published HTTP Live Streaming HLS as RFC 2816.

Examples of streaming protocols that require client-based content selection are MPEG-DASH, HTTP Live Streaming HLS and others like Micsooft Smooth Streaming developed by Microsoft. MPEG-DASH is standardized and published by the international standards organization (ISO) and international electrotechnical committee (IEC) and HTTP Live Streaming (HLS) is published by the Internet Engineering Task Force (IETF) which both are established standards bodies. What these protocols disclose is the textual description of the different content segments available for selection. The clients can learn from this textual description what media segments and respective groupings (representations) with fixed properties such as bit-rate and/or segment duration. However, these standards or derived application standards like DVB-DASH, 3GPP-DASH or ATSC do not disclose method and heuristic for content and bit-rate representation selection and related available bandwidth estimation from multiple content segments in the manifest. This aspect is left to competition between different streaming client player vendors that can implement their own adaptation algorithm for selection of segments. The selection mechanism may be different for different types of networks such UMTS, LTE (4G) or WiFi such as defined in IEEE 802.11 or any other network interface. Also, it can be different for different types of content (e.g. low latency content, variable bit-rate content etc.), making content selection a very tailored and broad problem. For example, in case of a delay constrained low latency content selection preferences should be different, or for a stream with variable bit-rate selection preferences and heuristics should be different etc.

This problem makes it very difficult to deploy cost efficient and high-quality streaming on streaming clients, and even more challenging for low (constrained) latency and high-quality content. In particular at the streaming client, throughput and response times of requests for media segments may be bound by the source encoding of the media, but also by the network throughput introducing ambiguity. This disclosure discloses a method and system for content selection of adaptive streaming content from a content server.

SUMMARY

In some embodiments, a method for content selection of adaptive streaming content is disclosed, where the method includes reading a media presentation description to identify a content model, initializing an objective function related to preferred streaming goals and one or more constraint functions related to streaming constraints into a third function. The method can further include initializing parameters and associated values from a memory, minimizing the third function and yielding a probability distribution of bitrate decisions. The method can further include calculating the expectation of the bitrate decisions based on the probability distribution of bitrate decisions and selecting one or more media segments where the difference between the bit-rates of the one or more media segments and the expectations of the bit-rate decisions is minimal. The method further includes requesting the one or more media segments, receiving the one or more media segments, storing the achieved download throughput in a memory, storing the one or more media segments in a memory, and decoding the one or more media segments from a memory and rendering it. In some embodiments, the method has a bitrate-adaptation algorithm based on Learn2Adapt, an algorithm that is also disclosed in this disclosure.

In some embodiments, the system for delivery of media presentations includes a client, a content server, a media presentation description that describes a grouping of the plurality of media segments available for download through the network into one or more representations, a network where the client is operatively coupled to the content server through the network and where the said content server makes a plurality of media segments available for download through the network. The client can be configured to execute a method for bitrate-adaptation and content selection which yields a probability distribution of bitrate decisions. The method executed by the client can include requesting one or more media segments where the difference between the bit-rates of the one or more media segments and the expectations of the bit-rate decisions is minimal and where a method for bitrate-adaptation and content selection executed by the client is a Learn2Adapt algorithm. The client can receive a portion of the plurality of media segments through the network, decode, and render the portion of media segments on a media player. In some embodiments, the client is an HTTP adaptive bit-rate client such as an MPEG-DASH client or an HTTP Live Streaming client.

DETAILED DESCRIPTION

It should be understood at the outset that, although an illustrative implementation of one or more embodiments are provided below and in FIGS. 1-4, the disclosed and illustrated systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
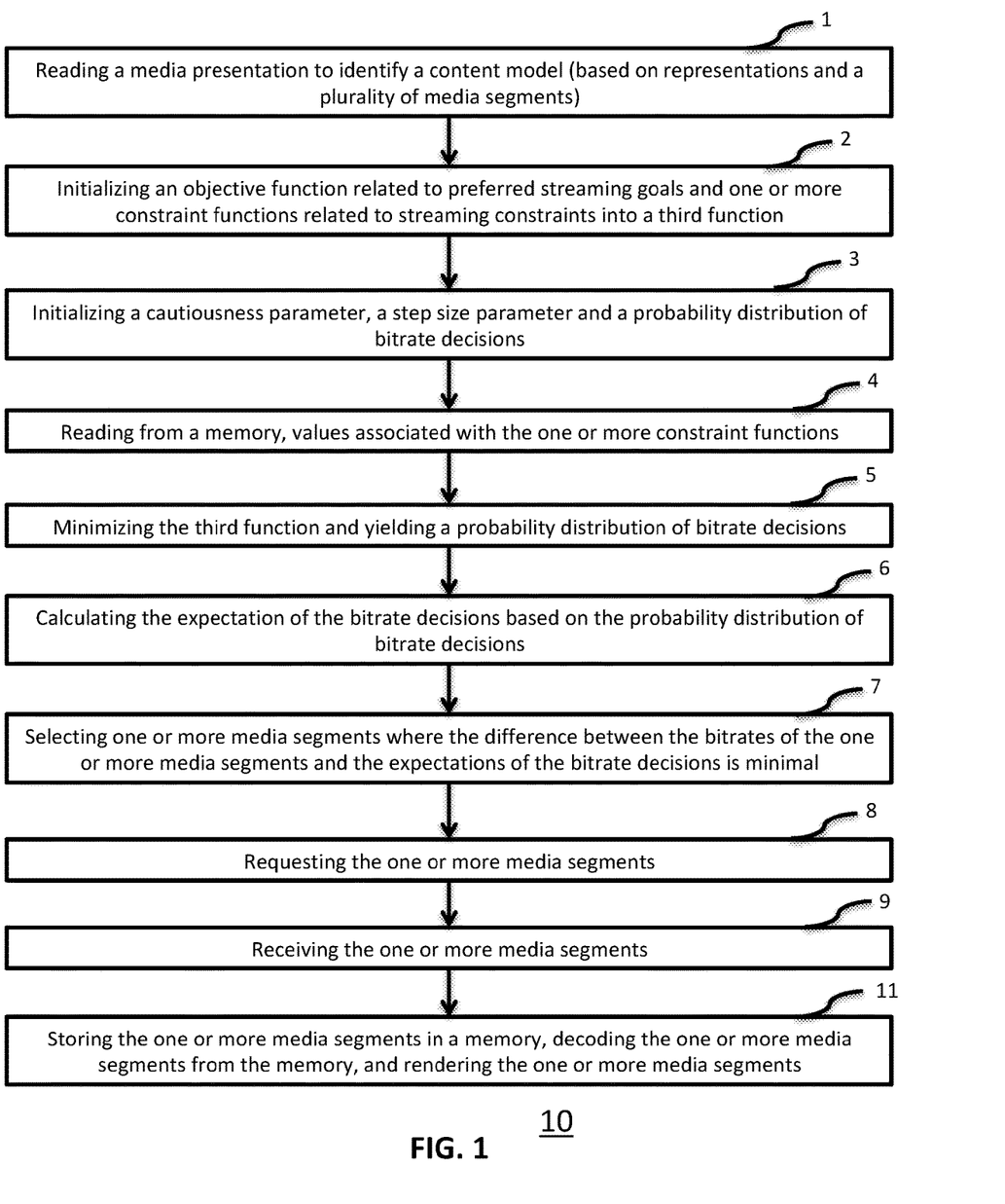
FIG. 1 is a flow chart illustrating a method in accordance with the embodiments.
Figure 2:
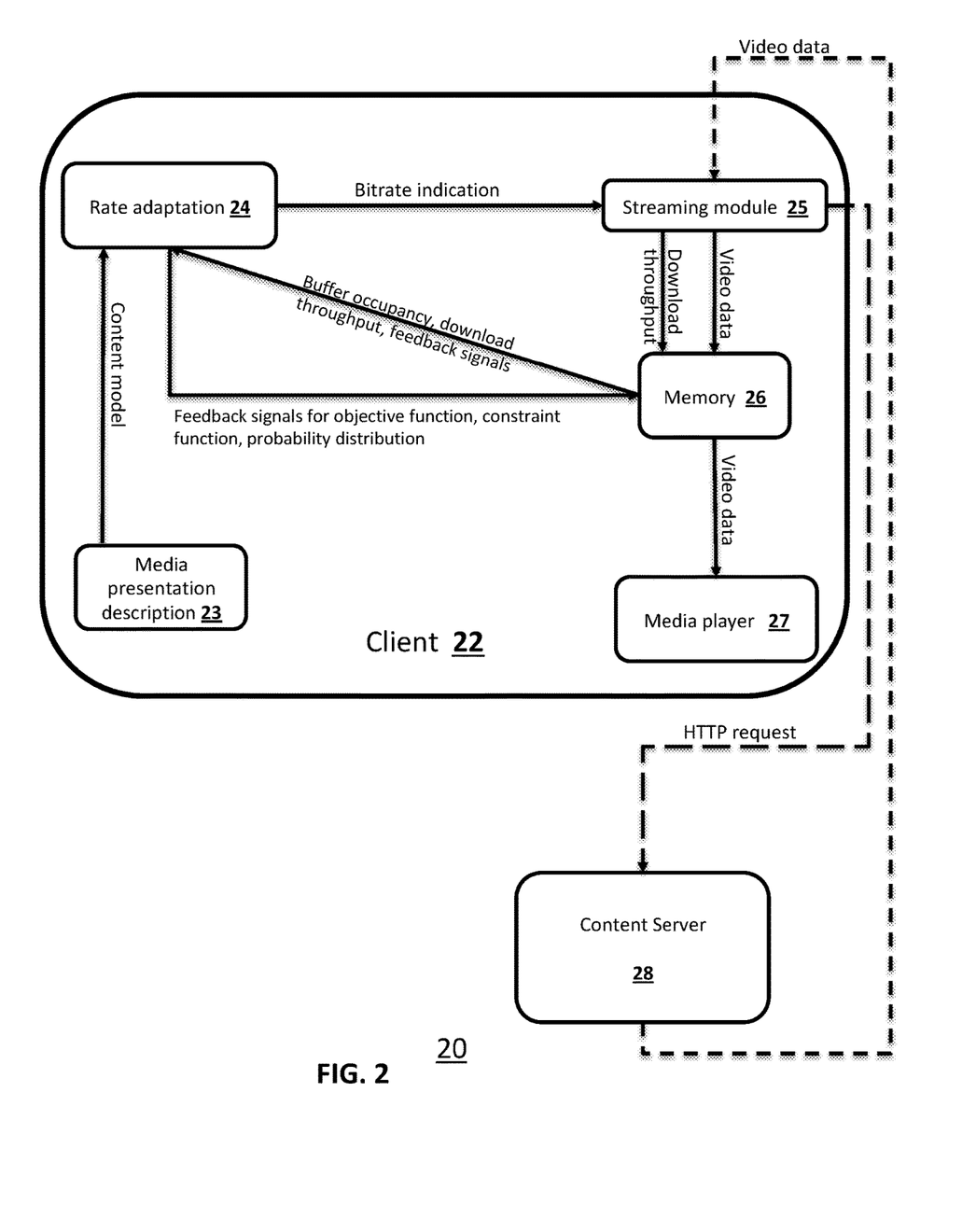
FIG. 2 is a block diagram of a system in accordance with the embodiments.

In the following text and with reference to FIGS. 1-4, media presentations refer to presentations of media comprising one or more audio and one or more video presentations and possibly other media such as images, timed text subtitles and so on. Media presentations are intended for display on a media playback device (27) that implements rendering of content to a screen and/or speaker in the case of audio. Common media presentations may be broadcast TV programmes or online video offerings such as offered by the likes of Netflix, Amazon prime video, Twitch etc. In each case, the end user is consuming a combination of audio, video and tertiary content such as subtitles, timed text and so on. In one embodiment as illustrated in FIG. 2, a system 20 can include a content server 28 coupled to a client device 22. The client device can include several modules and information that can include a media presentation description 23 that provides a content module to a rate adaptation module 24 which provides a bitrate indication to a streaming module 25 which receives video data from the content server 28 in response to HTTP requests from the streaming module 25. The streaming module stores the video data and a download throughput (value) at a memory 26. The memory 26 also stores and/or buffers the video data to the media player 27. The memory also provides information, certain parameters and feedback signals (including buffer occupancy information, the download throughput) to the rate adaptation module 24 and the rate adaptation module further provides feedback signals to the memory including feedback signals for the objective function, constraint function, and probability distribution as further explained in detail below.

Figure 3:
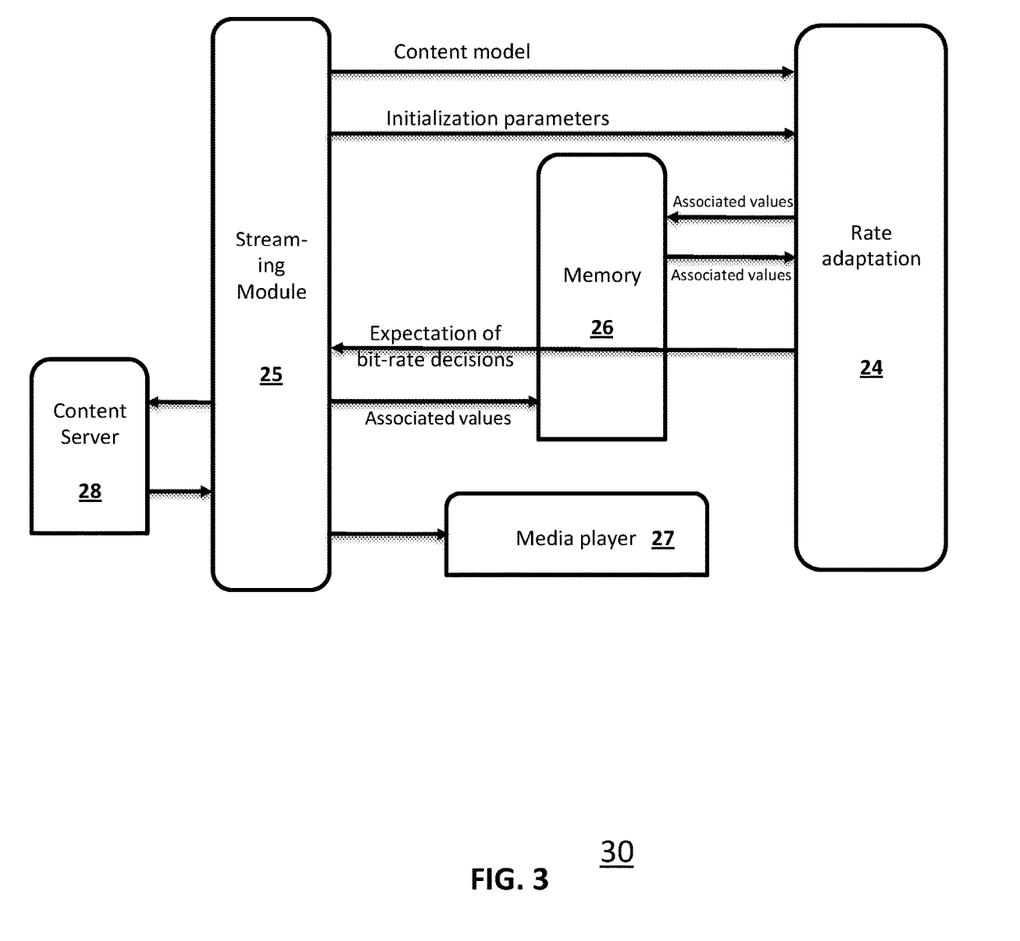
FIG. 3 is another block diagram of a system in accordance with the embodiments.

In the rest of this disclosure, the Media presentation description (23 as shown in FIGS. 2 and 3) refers to the textual document describing media segments available and their grouping and timing characteristics. Examples could be the MPEG-DASH media presentation description or media presentation descriptions derived from HTTP Live Streaming. FIG. 3 illustrates a similar diagram to FIG. 2 including a system 30 that includes similar modules and also shows the flow of information. The streaming module 25 makes a request of the content server 28 and provides video data to the streaming module 25. The streaming module 25 sends the content module and initialization parameters to the rate adaptation module 24 and the rate adaptation module and memory 26 exchanges associated values related to the content module and initialization parameters. The rate adaptation module 24 further sends an expectation of bit-rate decisions to the streaming module 25. The streaming module 25 also sends associated values to the memory 26 as illustrate. Based on all the inputs and outputs, the streaming module 25 sends video data to the media player 27 as further detailed below.

Such information from the media presentation description 23 can be used to derive a content model of the media that allows the different renditions and groupings to be clearly identified and expressed, especially to enable streaming features like bit-rate switching and bitrate-adaptation and content selection for accessibility choosing a language or a timed text subtitle scheme and so on. The most common model for streaming content is based on the Common Media Application Format that composes media presentations for streaming in CMAF tracks combining segments for a single quality, into switching sets intended for switching between, aligned switching sets, selection sets. Such CMAF presentations where all tracks are aligned and proved different aspects can be used by streaming manifest such as the media presentation description or the master playlist and media playlists in HTTP Live Streaming. Such a CMAF presentation defined in the CMAF specification (sections 6 and 7) can be used as the content model. Similarly, MPEG-DASH defines a continent model where the media presentation is composed of adaptation sets that each carry one or more representations that refer to each of the segments available for download. The MPEG-DASH content model also has a very clear XML based scheme definition and very well defined relationships between structures and requirements on the media segment formats. In some embodiments the content model may be based on MPEG-DASH media presentation description and segment formatting.

The media segments are the small pieces of content, typically with durations ranging from 1 to 16 seconds, that are typically carried using a media container such as ISOBMFF defined in MPEG-4, or Common Media Application Format (CMAF) which defines media segments and fragments that could be used. Alternatively, in some cases another container format like MPEG-2 TS developed by ISO/IEC or WebM can be used. Currently, CMAF fragments and/or segments are common media segments.

Representations typically refer to the part of the content model or media presentation description that groups segments, that are in a temporal order, and are grouped based on a particular aspect, usually the bit-rate or quality. The adaptation set in MPEG-DASH or switching set in CMAF can then include multiple representations to allow switching between them by choosing segments from a different representation having a different quality or bit-rate. This disclosure discloses a method for bitrate-adaptation and content selection executed by a client, that can choose the media segment from different representations.

The content model is a description of the content that the client can understand to apply streaming features such as bit-rate switching by selection of media segments from different bit-rate representations. Second it can also be used to understand the features of the media presentation for streaming. A common content model as previously mentioned can be a CMAF presentation defined by ISO/IEC that groups a media presentation in tracks and switching sets to switch between. Another content model could be the model defined by MPEG-DASH in ISO/IEC 23009-1.

In the rest of this disclosure the objective function is a mathematical function related to preferred streaming goals, such as achieving a higher overall bit-rate or a constrained latency. This function is used in the optimization problem definition and combined with one or more constraint functions in a third function that is the function finally used to solve the optimization problem.

One or more constraint functions related to streaming constraints are functions that constrain the eventual solution are defined and disclosed. Constraints could be an upper or lower bound, e.g. the buffer filled with media segments should be larger than a certain threshold and so on. The Constraint function is often used as a constraint that needs to be satisfied to minimize or maximize the objective function. Constraint functions related to streaming constraints and objective functions can be combined in a third function that is eventually used to solve the optimization problem. The third function is a combination of an objective function related to preferred streaming goals and one or more constraint functions related to streaming constraints.

A Cautiousness parameter is a parameter used in the learning process, in case a cautious decision is needed. Cautiousness parameter is a scalar value chosen at initialization and can be configured for convergence. It is a parameter that guides towards a more conservative decision process. A higher parameter will lead to faster convergence, while a smaller cautiousness parameter will lead to slower convergence, with less risk of violating constraints.

A step size parameter is chosen as a step size for iterative prediction schemes, and examples could be a gradient descent operation where the step size determines the distance of two consecutive points (decisions) of the iterative descent operation.

Optimization horizon depicts the number of decision epochs (iterations for requesting a media segment) that concern the optimization problem. In the context of streaming this can be the number of bitrate decisions that are required within the duration of the streaming session, i.e. each opportunity to switch in the stream can be referred to as a decision epoch. In MPEG-DASH when bitrateSwitching and SegmentAlignment are true in an adaptationset each media segment is also an opportunity to switch, i.e. a decision epoch.

Alternatively the optimization horizon can be set according to convergence preferences. Convergence concerns the property of an optimization solution to approximate the theoretical optimal solution.

A Euclidian projection is a mapping of a set (or other mathematical structure) into a finite-dimensional Euclidian space.

The Lagrangian multiplier is a parameter that is updated in an aggregative manner, at every decision epoch and is used to guarantee that the optimization constraints are respected on average at the end of the iterative bitrate decision process. This parameter is used in the rate-adaptation algorithm disclosed in this disclosure referred to as Learn2Adapt.

A probability distribution describes the likelihood of obtaining the possible values that a random variable can assume. A probability distribution can be expressed as a finite set of continuous values that can in turn be used to express the likelihood of an event that may belong to a discrete set. The probability distribution can be used to calculate the probability that an outcome. In case of this disclosure, probability distribution is returned in a memory, and it can be used to do common probabilistic operations such as calculating expectations. For the case where a probability distribution models the bit-rate selections, a continuous probability distribution is returned, based on which, by applying expectation of the bit-rate decisions, probability distribution estimates can be achieved. To select a final bit-rate decision, the difference between the bit-rate of one or more media segments and the expectations of the bit-rate decisions should be minimal. So the solution for selecting media segments in the disclosed embodiments is chosen to be the one or more media segments, where the difference between the bit-rates of the one or more media segments and the expectations of the bit-rate decisions are minimal. In addition, for each bit-rate decision, the difference between the bit-rate of the media segment and the expectation of the bit-rate decisions is minimal.

The values associated with the one or more constraint functions may be values like the buffer occupancy, the achieved download throughput, which is the number of bits per second received on the last media segment request. These values are stored in a memory (26) and are used to update the constraint function related to streaming constraints and one or more objective functions related to preferred streaming goals in each iteration. The client 22 will read these values from the memory 26 and use them to update the one or more functions related to streaming constraints and the function related to streaming goals (the objective function) as part of the rate adaptation 24.

Decoding implies the decoding of a compressed media format to an uncompressed media format. Popular decoding operations include AAC or dolby AC-3 decoding, AVC video or HEVC video decoding, or decoding from any other known or unknown compressed media format. The operation is typically applied by a media player 27 at the client 22 and may use hardware acceleration. The result is the raw media or waveform that can be rendered by a display or speaker device.

Rendering is converting the digital signal to an output physical signal, in case of video or images and text this refers to rendering the pixels into the screen, possibly compositing them on top of other visual contents. For the case of audio a sound wave will be produced by a speaker or head phone device following the digitized signal, amplified based on volume of the speaker and the digitized media signal. A rendering device is a device to do such rendering which could be built in a client, such as speakers, graphics cards and visual displays connecting through HDMI cables and many other setups for rendering multimedia content.

The Randomization operation is an operation applied to a discrete function to convert it to a random process that assumes values in continuous space according to a probability distribution. This is typically achieved by a proxy variable that belongs to a continuous space, that is used instead of the original variable, that is discrete. Given any specific value of the proxy continuous variable, the random process can be used in calculations that assign the outcome of a random experiment to each time instant. Based on that the initial discrete function can be computed, via weighting the possible outcomes given the proxy probability distribution.

The method for bitrate-adaptation and content selection executed by the client, refers to the overall bitrate-adaptation algorithm that is implemented as instructions to a processor, that are stored in a memory and iteratively executed. The method may also be implemented using other means known or unknown to be in existence such as using a chip or FPGA or an embedded micro-device. More particularly with reference to FIG. 1, in some embodiments a method 10 for bitrate-adaptation and content selection can include reading at step 1 a media presentation to identify a content model (based on representations and a plurality of media segments), initializing at step 2 an objective function related to preferred streaming goals and one or more constraint functions related to streaming constraints into a third function, initializing at step 3 a cautiousness parameter, a step size parameter and a probability distribution of bitrate decisions, and reading from a memory at step 4, values associated with the one or more constraint functions. At step 5, the method 10 can minimize the third function and yield a probability distribution of bitrate decisions. At step 6, the method can calculate the expectation of the bitrate decisions based on the probability distribution of bitrate decisions. The method 10 can further include the step 7 of selecting one or more media segments where the difference between the bitrates of the one or more media segments and the expectations of the bitrate decisions is minimal, requesting at step 8 the one or more media segments, and receiving at step 9 the one or more media segments. At step 11, the method 10 can further include storing the one or more media segments in a memory, decoding the one or more media segments from the memory, and rendering the one or more media segments.

Default initialization parameters are parameter values set to an algorithm or for a method for rate adaptation and content selection executed by the client at the beginning. Parameters include earlier described cautiousness parameter, and a step size parameter. Further the objective function related to preferred streaming goals may be configurable through initialization parameters, and the one or more objective functions related to streaming constraints may be configurable as well. The default initialization parameters disclosed include the following:

Optimization horizon (T) is initialized by the number of decisions that will be executed by the bitrate adaptation algorithm, or according to preferred convergence settings.
cautiousness parameter $V_L = T^{(1-\varepsilon)}$, where $\varepsilon \ll 1$. We propose $\varepsilon = 0.1$.
Step size $\alpha = \max\{T, \sqrt{V_L T}\}$
Probability distribution vector is initialized to achieve equiprobability
Lagrangian multiplier is initialized with zero.

These are the default initialization parameters for Learn2Adapt rate adaptation algorithm, nevertheless other initialization, are also possible and not excluded by any means from the embodiments, yet it is believed that these parameters can be used for initialization in preferred embodiments.

Online convex optimization (OCO) is an optimization technique to optimize an objective function with budget constraints. It introduces some of the necessary modelling assumptions which are the utility (objective) and constraint functions. In this case the utility function is the objective function related to streaming goals and the one or more constraints functions are the functions related to one or more streaming constraints.

The first step in describing the problem statement is to define the bitrate adaptation problem as an online convex optimization problem (OCO) with budget constraints, where the goal is to minimize the cumulative losses (referring to streaming specific constraints, such as latency or the negated average achieved bitrate) while keeping the cumulative constraint functions (typically associated to streaming-specific constraints, such as buffer upper and lower bounds), negative.

In the OCO framework, the objective and constraint functions are unknown at decision time and chosen based on an adversarial setting; a statistical setting that is general enough to include any potentially time-varying distribution. Learn2Adapt relates these functions to the random evolution of the channel rate, which is not adversarial. Nevertheless, the adversarial setting is general enough to include any potentially time-varying distribution of the download throughput. In general, the adversarial setting used is general enough to include all dynamics of the channel and thus it mitigates any requirements for explicit measurement or estimation of throughput. This is unlike other algorithms for bitrate-adaptation; a property that facilitates robust bitrate adaptation by the client.

Consider the following functions for the objective function, that is the objective function related to streaming goals, and the constraint functions, that are the constraint functions related to streaming constraints, or the case the framework is used in a context of low latency adaptive streaming:

The objective function in the bitrate adaptation optimization problem is typically related to streaming goals, such as the minimization of latency or alternatively the maximization of average bitrate for all downloaded media segments.

The constraint functions in the bitrate adaptation optimization problem are typically related to streaming constraints such as avoiding stalling due to buffer underflow, memory constraints associated with buffer overflow or minimization of the frequency and amplitude of bitrate switching.

where the objective function expresses the penalty (added latency at every decision epoch or negated achieved bitrate, respectively) for selecting the corresponding encoding bitrate level (high bitrate yields smaller losses), and the constraint function constrains the selection a media segment with a certain bit-rate and also expresses the buffer displacement, which is also used to model the buffer underflow constraint.

Media streaming using the Internet as transmission medium often uses video contents comprising media segments encoded at different bit-rates stored at content servers 28 and described using a textual descriptor, the media presentation description 23, such as the MPEG-DASH media presentation description defined in ISO/IEC 23009-1 or a media presentation description is derived from the HTTP Live Streaming playlists (HLS) defined in RFC 8216. These two popular adaptive streaming protocols are used as an example, but any other similar adaptive streaming protocol that provides a textual description that can be used as a media presentation description 23 describing links to media segments and grouping in representations of the streaming contents that clients can request and that can be a content model. Examples include the Microsoft smooth streaming client that can request segments based on a manifest file including groupings in representation or bit-rates deriving a content model. MPEG-DASH clients that can request media segments described in an MPEG-DASH media presentation description, and grouped in representation having a different bit-rate, from a content server, or HTTP Live Streaming clients that can request segments described in media playlists are yet other examples. Without loss of generality the textual description to describe the media segments available and the grouping is referred to as a media presentation description 23 throughout the rest of this document. The grouping described in the media presentation description in representation and the media segments may together describe a (streaming) content model. An example content model is the CMAF presentation content model.

As long as the media presentation description 23 can be used when it includes references, such as by Uniform Resource Identifier URI or URL Uniform Resource Location to different media segments that are available on a content server for selection, the content model will generally work in the embodiments. In addition in the media presentation description 23, the URL's or URI's may be used to request media content items by using a protocol like HTTP. To request the media segments described in the media presentation description, they can be requested using HTTP GET requests. However, a naïve method where a client is requesting media segments using HTTP GET request and simple heuristic often results in non-satisfactory playback or download, which typically leads to undesirable events like stalling of the playback, lower videoquality and wasted resources. Requesting content using an HTTP request will lead to different response times, different achieved download throughput of the requested media segments. Current standards do not disclose a method for selecting media segments, and requesting them to a content server that guarantees smooth quality rendering, decoding and playback.

To do this in a manner, that uses the available bandwidth efficiently and leads to satisfactory decoding and rendering without stalling is challenging. This is because the available bandwidth may vary, and the properties or media segments and decoding and rendering properties of the client and rendering device may be time-varying too. All of this makes the decision of which media segment to download and when to download it challenging.

Altogether, the nature of HTTP, the world-wide-web and the currently available client implementations make low or constrained latency and stable playback even more difficult to achieve. By requesting media segments, under the constraint of a low or bounded response time, the media segment bitrate selection becomes even more challenging and critical, as it will be more likely that incorrect bitrate decision for a segment download may lead to stalls (playback interruption), since a smaller number and duration of media segments are buffered by the client. This is especially the case for live streaming, which comprises several steps such as encoding, packaging and delivery of content to a client. The plurality of steps in live streaming make delays from capture to rendering in the order of 30 seconds common in clients.

New efforts to enable low latency streaming services over HTTP are reflected in emerging industry specifications such as DVB-DASH, a profile specification of MPEG-DASH which added low latency content support and the DASH-IF (DASH Industry Forum) guidelines for low latency. Also a low latency mode of HTTP Live Streaming was introduced by Apple. In these specifications, the duration of media segments is made shorter (in the order of 1-2 seconds), or otherwise, media segments may be composed of multiple subsegments called chunks as defined in the Common Media Application Format (CMAF) ISO/IEC specification. By using segments composed of multiple smaller subsegments, not all indexing information is needed at once when creating, processing or transmitting the segment. To elaborate, either shorter duration of the media segments can be used, or segments are composed of multiple parts or chunks, allowing more fine-grained processing. One way to make use of this granularity for processing and transmission in clients is to use HTTP Chunked transfer encoding, that allows content transfer and download before the object size is known, and is supported by the HTTP 1.1 protocol.

The architecture for live streaming with low latency, typically adopted today, includes a live adaptive bit-rate (ABR) encoder that encodes the media content, possibly originating from a mezzanine feed (this can be based on a broadcast or contribution signal). The output of the live encoder includes the content encoded at the different bit-rates and with a segmented structure that is a fragment boundary aligned between the different representations. Output could in some embodiments be based on the Common Media Application Track Format (CMAF) or the MPEG DASH segment formats, the MPEG-2 transport stream format or any other known media segment or container format.

The output of the live encoder is typically fed to a packager or content server to encrypt the streams (content) and prepare it in a streaming format. A content delivery network, comprising one or more intermediate cache proxies can then be used to finally deliver the content to clients. However, the clients 22 are in charge of requesting the appropriate bit-rate for all segments based on information contained in the media presentation description that groups the segments in representations. Typically media segments are stored at a content server 28, that can be any type of HTTP enabled web server such as based on nginx, Apache, Varnish, or other web servers. In preferred embodiments the content server 28 may be based on Unified Origin as developed by CodeShop and Unified Streaming.

A client 32 comprises a media player 23 for playing media segments 4, such as but not limited to audio and video media segments. Example clients 32 include Smartphones, TV's, tablets, personal computing devices (laptops) and entertainment systems (i.e. in planes, cars) with support for adaptive streaming. A media player 23, executes instructions on a CPU from a memory, as to decode and render to a screen or audio playback device, digital media such as audio or video. Most media players can decode and render video content in popular standards based formats such MPEG-4 ISOBMFF, Common Media Application Format (CMAF) or MPEG-2 Transport Stream (TS) files. In addition to common media player functions, such as playing, pausing, stopping, rewinding, and forwarding, some other common functions include zooming/full screen, audio channel selection, subtitle selection, and frame capturing. Many of the recent media players also support simple playback of digital audio and playback of 3D video. A client also supports streaming, possibly enclosed in the media player or embedded as a separate streaming module. In that case the streaming module is responsible for downloading media segments and parsing the media presentation description and deriving the content model. This may in some embodiments happen via a natively embedded streaming module or via a plugin based or third party streaming module. In preferred embodiments the client is equipped with a memory buffer that implements a data queue data structure for inserting and removing data from the memory. A client can use that to store media segments received by the streaming module or natively by the client, before they are decoded and rendered by the media player. This buffer queue is used to mitigate download rate oscillations, provisioning against delayed receipt of selected content segments, an occurrence that typically would lead to a stalling (or stall) event stopping playback temporarily. Essentially, the buffer queue management serves as a protective cushion, that absorbs short-term variations in network throughput by storing a queue of media segments downloaded in the memory, be it Random Access Memory, a CPU Cache, a Solid State Disk Drive (SSD) or any other type of memory to store the media content segments.

More improvements to HTTP based streaming protocols were adopted for applications that require low latency support. These include signaling latency requirements in the media presentation description. In addition, HTTP Live Streaming (HLS as defined in RFC 2816) introduces the notion of parts, which are sub parts of media segments. In case content is requested at low latency, sub parts of a media segment can be selected or gradually extracted from an intermediate download of the longer media segment. However, when the content is requested at a later time or stored in a Content Delivery Network, the parts can be combined into a single media segment again. The Common Media Application Format (CMAF) standardized by the ISO/IEC 23000-19 provides a segment and track format for streaming content that is used by popular streaming protocols like MPEG-DASH and HTTP Live Streaming. This CMAF standard also defines similar subdivision of media segments or fragments into chunks. The content model defined in section 6 of CMAF can serve as a preferred instantiation of a content model, i.e. based on the CMAF presentation 26.

In this case multiple chunks can be combined into a segment similar as in the HTTP Live Streaming specification. Other features in low latency HTTP Standards such as those developed by the DASH Industry Forum or by DVB-DASH include information about minimum, maximum and target latencies, in the media presentation description, and support for smaller segments and the said media segments comprising one or more CMAF chunks. Different methods in players can be used to support latency that comprise different techniques or steps, such as faster than real time decoding, variable playback rate to catch up with the live edge, fast codec initialization, lower start-up delay by embedding initialisation data, and seeking within media segments. However, one aspect of the players that is not yet disclosed nor understood well today is how a client should select the right bitrate for media segments of low latency adaptive streaming content to meet such target latency requirements. This is because in the low latency case, the simple bit-rate estimation of dividing the segment size in bits with the download time does not work well. This is because segments may still continuously be generated or processed once requested, and the download speed then depends on how fast the new chunks that compose the segment are becoming available, instead of the download bit-rate supported by the network throughput. This makes it so that a common streaming client device may get confused when dealing with low latency content in content selection and bitrate-adaptation.

The media presentations are delivered to the client in a known segment format such as based on MPEG-4 file format, Common Media Application Track Format, MPEG-2 TS or any other known media segment format that can be used by a streaming protocol. However, the media presentation description, which could be an MPEG-DASH media presentation description or one or more HLS media playlist referenced by a master playlist, reference each of these segments. The content delivery network, which can be based on a commercial content delivery such as Amazon Cloudfront™ or Akamai™, or any other network using proxy cache functionalities for temporarily storing a plurality of media content segments that can be used to improve the delivery by providing this caching and delivery layer.

A client selects media content, formatted as media segments such as based on Common Media Application Format (CMAF), MPEG-2 Transport Stream or MPEG-4 ISO Base File Format (ISOBMMF). Before it was made available, the video content was encoded in media segments grouped in different quality representations (e.g., representations may have different resolutions to meet the diverse display capabilities of different types of user devices and different encoding rates to facilitate adaptation to changing network characteristics). The media segments are made available on a content server by ingesting the content segments to that server. The adaptive bit-rate encoded content can also be made available by different means, as long as the content can be stored on the content server and made available by a URL or URI to segments corresponding to the URI/URL that can be read or derived from the media presentation description.

This ingest can be done using file upload or a specific media ingest protocol such as for example defined by the DASH Industry Forum live media ingest specification. Media segments are grouped in representations, that are a temporal sequence of media segments. Each segment typically accounting for a few seconds of video. For each representation there is an initialization segment which contains the configuration data and a plurality of media segments. Concatenating the initialization segment and a series of media segments results in a valid fragmented ISOBMFF file or CMAF track that can be played back by an MPEG-4 compatible media player. Such MPEG-4 compatible media player may be used to playback the stream.

Once the media presentation description is received and parsed by the client, the client then deploys instructions to execute a rate adaptation algorithm, that sequentially selects the media segments with different bit-rates, given network conditions. The clients can be implemented using hardware or software instructions running on a central processing unit, and a network interface implementing a TCP/IP stack and the Hyper Text Transfer Protocol (HTTP), the rate adaptation algorithm can be implemented as instructions in memory executed by a central processing unit. Based on the bitrate-adaptation algorithm, the client then selects the corresponding quality representation and independently requests and downloads media segments in a finite-sized queue, known as the buffer, from that representation.

In the streaming client, rate adaptation depends on the underlying transport protocol algorithm to regulate the video transmission rate, which is determined by the congestion feedback path. In many cases this underlying protocol is the TCP Transmission Control Protocol. The transmission control protocol will adapt to the current network conditions, such as losses measured by TCP Acknowledgements and delay. The mechanism used by TCP to limit the transmission is by decreasing the sliding window size allowing less data to pass through to the client simultaneously. However, by selecting segments, the client still controls how much data is being transmitted from the server, so in case TCP's congestion window is decreasing, lower bit-rate segments should be requested.

This way the client can be continuously downloading media segments, by selecting the right media segments that can be supported by the currently available network bandwidth available over the TCP connection or any other connection. Initially, the client starts requesting video segments sequentially as fast as possible to fill the play-out buffer; this is known as the 'filling state'. Once the buffer has been completely filled, the client enters a 'steady' state, where it periodically downloads new segments according to the decisions of the deployed bit-rate control logic.

The rate adaptation adaptation algorithm tries to avoid streaming problems like, rate oscillations and buffer starvation, while improving viewing quality. The particular rate adaptation disclosed in these embodiments is referred to as Learn2Adapt. In particular, Learn2Adapt strives to achieve (i) minimal re-buffering events that occur when the playback buffer depletes, (ii) a high overall video bitrate with respect to network resources (iii) reduction in latency and (iv) minimal video rate oscillations, which occur due to frequent bitrate switching.

There exist numerous designs of bitrate adaptation algorithms, that are classified according to the input dynamic used for the bitrate decision and/or the streaming architecture module that implements the adaptation logic. In throughput-based rate adaptation, the bitrate-adaptation logic is based on the measured available network throughput, which is usually calculated as a function of the size of the fetched segments and the actual download time. Typically, a throughput-based rate adaptation method is based on a four-step model where initially the available network throughput is estimated using a proactive probing mechanism, that is designed to minimize video rate oscillations. (See cite {https://ieeexplore.ieee.org/document/6774592} for more details). Then, the throughput estimates are smoothed using noise-filters to avoid estimation errors due to throughput variation and a decision of the bitrate for the next segment is made. In the last step, the scheduling of the download is considered with the objective to drive the buffer level towards the maximum buffer level. Commonly, in throughput-based adaptation, the inter-request time between consecutive segments is matched to the necessary time needed to complete the download, based on the smoothened estimated available throughput. Learn2Adapt disclosed in this embodiment does not directly use throughput estimation, it instead uses achieved download throughputs that are measured upon receiving requests to predict other parameters and function values, this can reduce dependence on such steps which may add computational overhead and errors.

In the buffer-based client-side rate adaptation scheme, the client uses application-level signals, such as the instantaneous buffer level, to perform the rate adaptation. Typically, buffer-based rate selection algorithms aim at maximizing the average video rate and avoid unnecessary re-buffering events using a direct mapping of the instantaneous buffer level to the set of available rate levels, or as a function of the segment size (See cite {https://dl.acm.org/doi/10.1145/2740070.2626296} for additional details). Alternatively buffer-based approaches can be based on control theory and optimization, forming an online control algorithm that aims to maximize a utility that is associated with the average bit-rate and re-buffering time, while adapting to network changes to account for better QoE (See cite {https://ieeexplore.ieee.org/document/7524428} for additional details). (BOLA is implemented in the DASH-IF reference player (See cite {https://dl.acm.org/doi/10.1145/3204949.3204953}z).

Buffer based adaptation does not work well for all types of media applications, for example, in low latency cases the size of the buffer and the number of media segments is low, thus it is not a good approach for low latency streaming content, or variable streaming content. Learn2Adapt disclosed in some of the embodiments herein does not directly use buffer based approaches.

The network-assisted approach allows the collection of measurements about the network conditions while assisting clients in their selection of the appropriate streaming rate. A special component (e.g., agent/proxy deployed in the network) is typically required to monitor the network status and conditions, that allows video streaming clients to efficiently use network resources. Network-assisted approaches, may generate significant overhead in the network, especially with increasing number of clients. This overhead may eventually lead to network congestion and other problems, possibly leading to a poorer reception quality. Learn2Adapt disclosed in some of the embodiments herein does not use such approaches.

In some embodiments, the client uses Learn2Adapt for the rate adaptation method, where this new approach utilizes optimization and learning based on results of earlier client requests. This is different compared to the previous approaches used in other implementations. The embodiments herein discloses the details of this approach of Learn2Adapt which works differently from other approaches.

In some embodiments the content server is based on current or future versions of the Unified Origin video streaming server provided by the Unified Streaming platform, yet other content servers that provide similar functionalities could also be used, functionality including but not limited to on-the-fly packaging or storage of media streaming content, Digital rights management and manifest generation. Otherwise a simpler content server without these functionalities can be used, e.g. vanilla/plain HTTP servers, such as apache or NGINX or servers storing content in a content delivery network (CDN). The segments referenced in the media presentation description could be generated on the fly upon client requests. Otherwise they could be cached or pre-stored. The content server can be based on a content delivery network, or a web server such as nginx, Varnish, Apache or any other HTTP supporting web server. In these cases the content server stores the media content and supports answering HTTP requests, having implemented an HTTP stack. Alternatively, a cloud storage with HTTP API could be used such as available from vendors and as open-source such as azure storage, aws s3, OpenStack Swift platform etc.

In some embodiments a client implements Learn2Adapt which is a particular rate adaptation algorithm that can be deployed using instructions on a central processing unit, in a streaming client. Contrary to buffer based or throughput-based algorithms, the client observes more than one feedback signals based on recently achieved results, that are then used as an input to the rate adaptation algorithm referred to as Learn2Adapt. The feedback is then processed, to select a suitable next media segment by the client. For example, if the throughput is high, some rate adaptation algorithms would select a higher bit-rate segments to provide streaming quality. However, Learn2Adapt would use a learning algorithm to select the best content segment.

The general goal of Learn2Adapt rate adaptation is to maximize the streamed video rate, subject to:
  avoiding playback interruptions caused by buffer underruns and
  minimizing video rate oscillations.
  minimizing the latency to the live edge.
The core challenge is balancing the rate maximization goal with the constraints and ultimately providing high quality video playback by the client.

In some embodiments, the client deploys Learn2Adapt, as a bitrate-adaptation method, to sequentially select media segments with the highest possible bitrate, given network and streaming constraints, bit-rate and quality. Typically the bitrate selection is hindered by two main unknowns at decision time, namely the download throughput and the segment size. Thus normally, a series of model requirements for both are required to perform the bitrate adaptation. On the contrary, the model-free approach through OCO (Online Convex Optimization) in Learn2Adapt offers an alternative and robust bit-rate adaptation strategy that does not rely on any statistical assumptions/models for the unknowns.

Learn2Adapt in the client uses constrained Online Convex Optimization (OCO), an online optimization method, where the client learns to make sequential decisions in order to minimize a loss function (objective), unknown at decision time. OCO is "model-free", as no assumption is required to be made for the statistical model of the unknowns. To proceed with application of OCO for content selection, the client performing the rate adaptation has the objective to minimize a loss function that can be modeled according to streaming QoE factors, such as the average buffer displacement (latency) of a streaming session or the average streamed bitrate. In order for the OCO framework to be deployed, the OCO requirement must be fulfilled that both the objective and the one or more constraint functions must be convex. The objective function is ensured to be convex via the randomization operation described prior, where the client is allowed to make decisions on the media segment selection, according to a probability distribution. The one or more constraint functions, typically associated (but not limited to this) with the upper and lower bounds of the finite buffer queue, are ensured to be convex by deriving a relaxation to an unbounded buffer that adheres to time-averaging constraints. The channel rate (throughput) evolution is modeled by an adversary, that decides the throughput and thus the cost (registered via the objective function) of each decision only after the bitrate decision has been taken, at every step (epoch). An adversary is a statistical setting that is general to include any potentially time-varying distribution. Learn2Adapt relates the objective and constraint functions to the random evolution of the channel rate $C_t$, which is not adversarial. Nevertheless, the adversary setting is general enough to include any potentially time-varying distribution of $C_t$. Thus, all bitrate decisions are based on historical values without requiring any throughput estimations. Learn2Adapt eventually solves the bitrate adaptation optimization using the OCO with budget constraints. One of the strong properties is that its formulation is modular, allowing to incorporate more factors and their weight prioritization to account for different streaming quality objectives and for multiple streaming scenarios and/or user classes. In the following we disclose a detailed technical description of the bitrate adaptation method Learn2Adapt and its design principles. Learn-to-adapt is the method for rate adaptation and content selection executed by the client. Learn2Adapt can be programmed as instructions in a memory that are executed by a central processing unit CPU, and where intermediate results are stored in a memory, such as a Random Access memory, a solid state drive memory, or a cache memory at the CPU or any other memory available of storing temporary and permanent data.

This section introduces the content model and parts of the method and system disclosed in preferred embodiments. A representation is a collection of media segments with approximately the same quality and bit-rate. In the MPEG-DASH manifest this would correspond to a representation Element and the media segments referred by it, and in an HTTP Live Streaming to a media playlists and the segments referred by it. When using MPEG-DASH or HTTP Live Streaming, CMAF segments or fragments can be used as media segments referenced by the media presentation description or media playlist. The media presentation description derived from the MPEG-DASH media presentation description or HLS master playlist can be used to derive a content model, such as a CMAF presentation.

Typically each media segment is encoded at N different quality levels and or bit-rates $R=\{R_1, R_2, \ldots, R_N\}$, that each form a representation.

In the following, we refer to the, typically variable, interval between two consecutive segment downloads as a decision epoch $t \in \{1, \ldots, T\}$, where T is the total number of decision epochs, referred to as the optimization horizon. In VoD streaming applications T is known and computed as $T=\lceil D/V \rceil$, where D is the video sequence duration and V the chunk duration which is typically constant for the duration of the stream. For live streaming applications, D is unknown and thus T is selected. While some low-latency streaming profiles also support chunks that do not provide a switching or decision opportunity at the boundary, without loss of generality, we assume switching at the chunk boundaries is possible. Popular streaming configurations/profiles like DVB-DASH or DASH-IF low latency live also support this explicitly by allowing short fragments composed of a single chunk.

At the beginning of the t-th decision epoch, the client decides and requests the media representation $x_t \in X=\{1, \ldots, N\}$ for media segment t, corresponding to representations with a target encoding bit-rate $r_{x_t} \in R$. The client can control the streaming with its decisions $x_t \forall t=1, \ldots, T$ made by the Learn2Adapt method for rate adaptation and content selection executed by the client. For instance, although choosing $r_N$ all the time produces high quality rendering and playback, it imposes the downloading of media segments that the available channel bandwidth by the network might not support. Therefore, the client is to adjust the bit-rate decisions to as much $r_n \in R$ as the client can support at a given time, an objective that also provisions against increasing the overall latency.

For a given content model $x_t \in X=\{1, \ldots, N\}$, the actual size of the t-th segment is denoted $S_{t,x_t}$ and measured in bits. The client issues a request for a media segment to the content server, for the t-th media segment and then waits for that media segment to be fully downloaded in a memory before requesting the t+1-th media segment.

The downloaded media segments are stored in a buffer in a memory of a size that may not exceed an upper bound $B_{max}$, due to memory constraints of the client device. The length of the buffer is directly correlated to the latency imposed in the stream, as larger queues are associated with longer service-times (playback). Thus, in particular, for low-latency applications, buffer lengths are targeted at values $B_{target} < B_{max}$. Let $B_t$ represent the buffer level at the beginning of the t-th epoch, measured in seconds of video. Upon completely downloading the t-th chunk, $B_t$ increases by V seconds (same for all chunks). Due to playback, $B_t$ is also consumed at playback rate $p_t$, which can be variable but for general intents and purposes is equal to a unit rate of playing one second per second (as long as $B_t > 0$). For time-sensitive streaming applications clients may alter $p_t$, in order to catch up with the live edge (reduce the end-to-end latency).

The content server is connected to the client possibly via a content delivery network (CDN) or proxy server. The downlink connection provided by the network provides a channel of average rate $C_t$. Namely, $C_t$ is the average effective downlink rate measured for the total period that the client downloads the t-th chunk. In practical operation it can be estimated.

The buffer evolves according to:

$$B_{t+1} = \left[B_t - p_t \frac{S_{t,x_t}}{C_t}\right]^+ + V - \Delta_t$$

where $[x]^+ \overset{\text{def}}{=} \max(0, x)$. To account for the upper bound $B_{max}$ the buffer, a delay $\Delta_t =$ $$\left[\left[B_t - p_t \frac{S_{t,x_t}}{C_t}\right]^+ + V - B_{max}\right]^+$$

is introduced. This delay protects against buffer overflow incidents, which occur when the buffer surpasses $B_{max}$. Typically, in low-latency streaming mode, the target buffer level $B_{target} \ll B_{max}$. Thus, in low latency streaming, $\Delta_t$ is rarely imposed.

A buffer underflow is the event occurring when the instantaneous buffer level drops below zero, causing a stall in the video playback. The goal of the method for bitrate-adaptation and content selection executed by the client is to strike a favorable trade-off between minimizing the possibility of a buffer underflow (or overflow) and minimizing the latency, while obtaining high average bitrate given network conditions, under no statistical assumptions.

The embodiments disclose the algorithmic solution of Learn2Adapt rate control based on the theory of OCO. Learn2Adapt uses OCO with budget constraints problems. Learn2Adapt introduces the necessary modelling assumptions which are the objective and constraint functions along with a set of relaxations that are required by the OCO framework.

The first step describing problem statement is to define the bitrate adaptation problem as a constrained OCO, where the goal is to minimize the cumulative losses $\Sigma_1^T f_t(x_t)$ (referring to streaming specific objectives, such as minimal latency or maximal achieved bitrate) while keeping the cumulative constraint functions (typically associated to streaming specific constraints, such as buffer upper and lower bounds) $\Sigma_1^T g_t(x_t)$, negative.

In the OCO framework, functions $f_t$, $g_t$ are unknown at decision time and chosen based on an adversarial setting; a statistical setting that is general to include any potentially time-varying distribution. Learn2Adapt relates these functions to the random evolution of the channel rate $C_t$, which is not adversarial. Nevertheless, the adversary setting is general enough to include any potentially time-varying distribution of $C_t$. In general, the adversarial setting used in Learn2Adapt is general enough to include all dynamics of the channel and thus it mitigates throughput estimation requirements; Learn2Adapt does not use throughput estimation unlike other algorithms for bitrate-adaptation, this is a property that facilitates robust bitrate adaptation.

Consider the following functions for the objective and constraint functions:

Objective function related to streaming goals:

$$f_t(x_t) = V - \frac{S_{t,x_t}}{C_t}$$

(minimization of the buffer growth per segment download which is equivalent to latency), or alternatively $f_t(x_t) = -r_{x_t}$ (maximization of average bitrate for all downloaded media segments)

Constraint functions are typically related to streaming constraints:

$$g_t(x_t) = \frac{S_{t,x_t}}{C_t} - V$$

(which captures the negated buffer displacement between media segment downloads and by keeping this value negative the optimization framework provisions against buffer underflow). Additionally a constraint function may be associated with the buffer overflow constraint, that due to memory constraints of the streaming device may set an upper bound to the amount of data that can be stored in the buffer, thus the related constraint function becomes $$g_t(x_t) = V - \frac{S_{t,x_t}}{C_t} - B_{max}$$

Multiple constraint functions can be defined at the same time.

where the objective function expresses the penalty (added latency at every decision epoch or achieved bitrate, respectively) for selecting the corresponding encoding bitrate level (high bitrate yields smaller losses), and the constraint function constrains the selection a media segment with a certain bit-rate and also expresses the buffer displacement, which is also used to model the buffer underflow constraint.

To formally cast the above problem as an OCO with budget constraints, Learn2Adapt solves the following complications first. First, Learn2Adapt provides a relaxation to the hard constraint of the buffer model ($B_t \in [0, B_{max}]$ non-continuous function). Second, since the decision set, i.e. the set of available representations, is discrete and therefore not convex, the OCO framework requires a randomization operation on the objective and constraint functions. In this direction Learn2Adapt associates a probability to each decision, by learning the probability distribution of the decisions, the distribution of decisions later being used to make the bit-rate decisions.

This paragraph discloses the relaxation on the finite buffer queue in preferred embodiments, to be inline with OCO's requirement for convex constraint functions. First Learn2Adapt uses the cumulative constraint function $\Sigma_1^T g_t(x_t)$, that is typically associated with buffer constraints (underflow and overflow) but may include other constraints related to streaming. Ensuring $0 \leq B_t \leq B_{max} \forall t$ is a very complicated control problem, which in the presence of unknown adversarial $C_t$ is impractical to solve by a client.

To avoid computationally computationally heavy approaches and to arrive at a simple (yet robust) solution, Learn2Adapt implements an alternative approach in preferred embodiments. In that direction, it treats the buffer as an infinite queue, with the simpler update rule:

$$B_{t+1} = B_t - p_t \frac{S_{t,x_t}}{C_t} + V.$$

By this, instantaneous violation of the buffer budget is possible, which incurs a penalty according to the queue's deviation $g_t$. This penalty method will maintain the buffer on the positive regime on average.

A benefit is that this constraint is in the realm of OCO theory. Overall, the Learn2Adapt approach here is to apply a loosely coupled control to the buffer constraint, by tolerating instantaneous violations and ensuring that in the long-term only a few are experienced.

To obtain convex objective and constraint functions, Learn2Adapt uses a randomization operation of the decision process, by considering the probability simplex:

$$\Omega = \{\omega \in R^N : \omega \geq 0 \wedge \|\omega\|_1 = 1\}$$

where $\omega_i = P(x=i)$ denotes the probability that we decide $x=i$, $i \in X$ $\Omega$ is a convex set. Instead of learning to decide $x_t$ (which is selected from an integer set), the approach in Learn2Adapt is to learn to decide a probability distribution $\omega_t = ((\omega)_{t,i})_{i=1,\ldots,N}$ selected from $\Omega$. The functions of interest, i.e. the objective and constraint function, become now random processes and must be appropriately modified them by taking expectations (with respect only to $\omega_t$ and not the randomness of $C_t$)

In the context of the constrained OCO formulation, the client has to solve the following:

$$\min_{\omega \in \Omega} \sum_{t=1}^{T} f_t(\omega_t) \text{ such that } \sum_{t=1}^{T} g_t(\omega_t) \leq 0$$

Since $C_t$ is unknown at decision time of $x_t$, it is impossible to know the values of $g_t$. Preferred embodiments of Learn2Adapt therefore are configured to learn the best $x_t$ based on our estimation $\hat{g}_t$ of $g_t$, achieved by a Taylor expansion around $g_{t-1}$.

$$\hat{g}_t = g_{t-1}(\omega_{t-1}) + \langle \nabla g_{t-1}(\omega_{t-1}), \omega_t \omega_{t-1} \rangle$$

Learn2Adapt combines the objective and the constraint functions in a third function. The said third function is known as a Lagrangian function:

$$L_t(\omega, Q(t)) = Q(t)\hat{g}_t(\omega_t) + V_L \hat{f}_t(\omega_t) + \alpha \|\omega_t - \omega_{t-1}\|^2$$

where Q (t) is a Lagrange multiplier, $V_L$ is a cautiousness parameter, $\alpha$ is a step-size, and $\|\omega_t - \omega_{t-1}\|^2$ a regularizer that smoothens the decisions. The addition of the regularizer, Learn2Adapt provides modular incorporation of supplementary streaming quality provisioning for the amplitude of bitrate switching. In Learn2Adapt, parameters $V_L$ and $\alpha$ are tuned for convergence and their choices are given in [0009]. In Learn2Adapt the Lagrange multiplier is updated in a dual ascent approach, by accumulating the constraint deviations:

$$Q(t+1) = [[Q(t) + \hat{g}_t(\omega_t)]]^+$$

Learn2Adapt is an algorithm that minimizes of the subgradient of the Lagrangian function, by a gradient descent operation. Gradient descent is an optimization algorithm used to minimize some function by iteratively moving in the direction of steepest descent as defined by the negative of the gradient.

Algorithm Learn2Adapt
1. Initialize: $Q(1)=0$, $\omega_0 \in \Omega$
2. Parameters: cautiousness parameter $V_L$, step size $\alpha$
3. for all $t \in \{1, 2, \ldots, T\}$ do     a. $\omega_t = proj_\omega \left[ \omega_{t-1} - \frac{V_L \nabla f_{t-1}(\omega_{t-1}) + Q(t) \nabla g_{t-1}(\omega_{t-1})}{2\alpha} \right]$     b. $Q(t+1) = [[Q(t) + \hat{g}_t(\omega_t)]]^+$ Here $proj_\Omega[\cdot]$ denotes the Euclidean projection on set $\Omega$. At every decision epoch $t=1, 2, \ldots$ T the following events occur in succession:
1. the client computes $\omega_t \in \Omega$ according to Learn2Adapt
2. the client chooses $x_t \in argmin_{x \in x} |r_x - \Sigma_{n+1}^N \omega_{t,n} r_n|$,
3. $C_t$ is revealed/computed, and the loss function $f_t(\omega_t)$ and the constraint function $g_t(\omega_t)$ are computed
4. one of the following forms of feedback are provided to the client:
    a. the value of $C_t$,
    b. the form of $f_t$,
    c. the value of gradients $\nabla f_t(\omega_t)$, $\nabla g_t(\omega_t)$.

Figure 4:
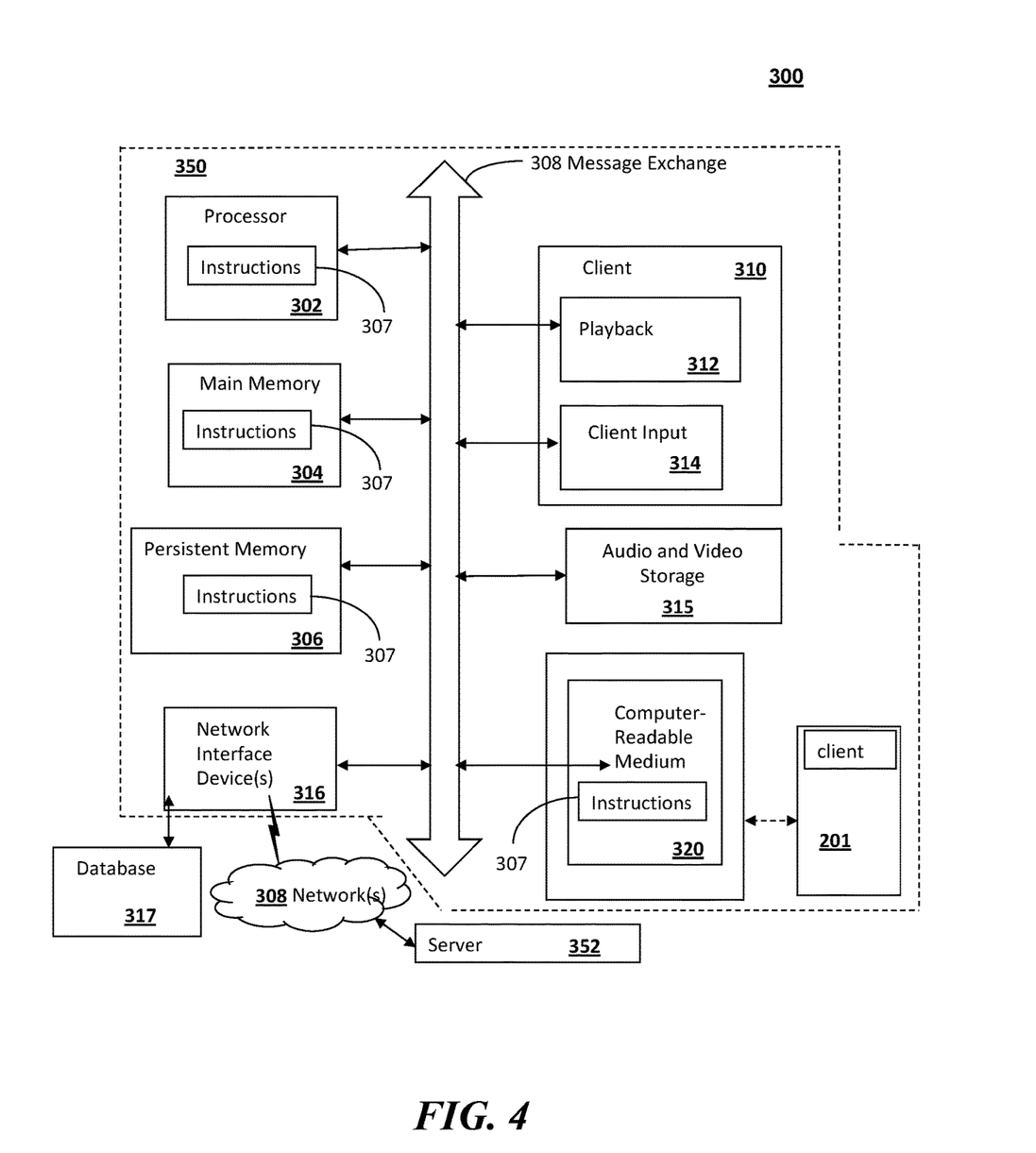
FIG. 4 is another block diagram of a system in accordance with the embodiments.

For example, FIG. 4 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

A computing architecture of the computer system 300 can include a system 350 having a client 201 or 310 with playback 312, client input 314 bundled in the client 310, an exchange of messages 308, where the system and method would run on a processor 302 based on instructions 307 that are stored in main memory 304 or in the processor cache 302, and further instructions can be stored on persistent memory 306. The exchange of information uses a network interface device 316 and a Network 308 and possibly a database 317. The message and data exchange 308 is connected to the audio and video storage 315 and to computer readable medium 320. The network 308 can also access a server 352 such as a content server.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C++, C#, VB.NET, Python, Vala, GEM, or the like, conventional procedural programming languages, such as the "C" programming language, Visual Basic, Fortran 2003, Perl, PHP, dynamic programming languages such as Python and Ruby or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS) and Security as a Service (SECaas). Further, the use of virtualization techniques such as using hypervisors based virtualization or operating system level virtualization to implement the proposed schemes is not precluded.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the disclosure. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In some embodiments, the method includes reading a media presentation description to identify a content model, initializing an objective function related to preferred streaming goals and one or more constraint functions related to streaming constraints into a third function, initializing parameters and associated values from a memory, minimizing the third function and yielding a probability distribution of bitrate decisions. The method can further include calculating the expectation of the bitrate decisions based on the probability distribution of bitrate decisions, and selecting one or more media segments where the difference between the bit-rates of the one or more media segments and the expectations of the bit-rate decisions is minimal. The preceding sentence can be summarized in elemental operations as follows. So the one or more media segments $t \in \{1, 2, \ldots, T\}$ are having bit-rates defined in the representation as $r_{x_t} \in R = \{R_1, R_2, \ldots, R_N\}$ and the expectation of the bit-rate decisions $E[r_{x_t}]$, where $x_t \in X = \{1, \ldots, N\}$ is the quality representation decision for media segment t, corresponding to representations with a target encoding bit-rate $r_{x_t} \in R$. The presentation selection for the one of more media segments $t \in \{1, 2, \ldots, T\}$ chosen such that $x_t \in \mathrm{argmin}_{x \in X} |r_x - E[r_{x_t}]|$. This corresponds to line 2 of the learn to adapt algorithm in [0093]. In case the there are multiple minima, that is multiple arguments have the minimum any can be chosen depending on the specific implementation.

The method can further include requesting the one or more media segments, receiving the one or more media segments, and storing the achieved download throughput in a memory as well as storing the one or more media segments in a memory (same memory or a different memory). The method can further include decoding the one or more media segments from a memory and rendering it. In some embodiments, the method includes a bitrate-adaptation algorithm that is based on Learn2Adapt. A system performing the method above can include a client, a content server, a media presentation description, and a network where the client is linked to the content server through the network and where the content server makes a plurality of media segments available for download through the network. The media presentation description describes a grouping of the plurality of media segments available for download through the network into one or more representations. More particularly, in some embodiments the client can execute a method for bitrate-adaptation and content selection that yields a probability distribution of bitrate decisions and where the method executed by the client includes requesting one or more media segments where the difference between the bit-rates of the one or more media segments and the expectations of the bit-rate decisions is minimal. In some embodiments, the method for bitrate-adaptation and content selection executed by the client is a Learn2Adapt algorithm.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed, is:

1. A method for streaming content selection, the method comprising:
    reading a media presentation description to identify a content model based on representations having an associated bit-rate and a plurality of media segments;
    initializing an objective function related to preferred streaming goals and initializing one or more constraint functions related to streaming constraints into a third function;
    initializing a cautiousness parameter, a step size parameter and a probability distribution of bitrate decisions;
    calculating expectation of the bitrate decisions based on the probability distribution of bitrate decisions wherein a bitrate-adaptation algorithm is based on Learn2Adapt;
    selecting one or more media segments where the difference between the bit-rates of the one or more media segments and the expectations of the bit-rate decisions is minimal;
    requesting the one or more media segments;
    receiving the one or more media segments;
    storing an achieved download throughput in a memory;
    storing the one or more media segments in a memory;
    decoding the one or more media segments from a memory; and
    rendering the one or more media segments that have been decoded.

2. The method of claim 1, wherein the media presentation description is a MPEG-DASH media presentation description or is derived from HTTP Live Streaming Playlists.

3. The method of claim 1, wherein the method guarantees smooth quality decoding, rendering, and playback of the selected one or more media segments when requesting content from the content server using an HTTP request.

4. The method of claim 1, wherein the content model is a CMAF presentation.

5. The method of claim 1, wherein the method further comprises the steps of reading, from a memory, values associated with the said one or more constraint functions and minimizing the third function and yielding a probability distribution of bitrate decisions.

6. The method of claim 1, wherein one or more of the steps of initializing the objective functions, initializing the one or more constraint functions, and initializing the cautiousness parameter using one or more default initialization parameters defined for Learn2Adapt.

7. The method of claim 5, wherein the step of reading, from the memory, values associated with the said one or more constraint functions is followed by a prediction of the one or more constraint functions by a taylor expansion.

8. The method of claim 5, wherein the step of minimizing the third function and yielding the probability distribution of bitrate decisions is done by a gradient descent operation.

9. The method of claim 1, wherein receiving the one or more media segments and storing the achieved download throughput in a memory includes the step of updating the objective function and the one or more constraint functions and storing them in a memory.

10. A streaming device, comprising:
one or more processors;
one or more memory devices coupled to the one or more processors, the one or more memory devices having computer instructions which when executed by the one or more processors causes the one or more processors to perform the operations of streaming content selections, comprising;
reading a media presentation description to identify a content model based on different representations having an associated bit-rate and one or more media segments;
chosing the media segments for content selection from different representations based on where difference between bit-rates of the one or more media segments and expectations of bit-rate decision are minimal;
adapting the bitrate based on the content model and the different representations where the chosing and adapting are modified based on feedback signals wherein a bitrate-adaptation algorithm is based on Learn2Adapt;
requesting the one or more media segments;
receiving the one or more media segments;
storing an achieved download throughput in the one or more memory devices;
storing the one or more media segments in the one or more memory devices;
decoding the one or more media segments from the one or more memory devices to provide one or more decoded media segments; and
rendering the one or more decoded media segments.

11. The streaming device of claim 10, wherein the one or more memory devices further comprises computer instructions which when executed by the one or more processors causes the one or more processors to perform the operations of
initializing an objective function related to preferred streaming goals and initializing one or more constraint functions related to streaming constraints into a third function;
initializing a cautiousness parameter, a step size parameter and a probability distribution of bitrate decisions;
reading, from the one or more memory devices, one or more values associated with the one or more constraint functions;
minimizing the third function and yielding the probability distribution of bitrate decisions;
calculating the expectation of the bitrate decisions based on the probability distribution of bitrate decisions; and
selecting one or more media segments where the difference between the bit-rates of the one or more media segments and the expectations of the bit-rate decisions is minimal.

12. The streaming device of claim 11, wherein the media presentation description is a MPEG-DASH media presentation description, or the media presentation description is derived from HTTP Live Streaming playlists.

13. The streaming device of claim 12, wherein the third function is a combination of an objective function related to preferred streaming goals and one or more constraint functions related to streaming constraints.

14. A system for streaming content selection, the system comprising:
a client, operatively coupled to a content server and a network, wherein the client is operatively coupled to the content server through the network and wherein the content server makes a plurality of media segments available for download through the network;
a media presentation description that describes a grouping of the plurality of media segments available for download through the network into one or more representations having an associated bit-rate;
wherein the client executes a method for bitrate-adaptation and content selection wherein the method yields a probability distribution of bitrate decisions and wherein the method for bitrate-adaptation and content selection executed by the client is a Learn2Adapt algorithm, the method executed by the client comprising:
requesting one or more media segments where difference between the bit-rates of the one or more media segments and expectations of the bit-rate decisions is minimal;
receiving a portion of the plurality of media segments through the network; and
decoding and rendering the portion of media segments on a media player.

15. The system of claim 14, wherein the media presentation description is an MPEG-DASH media presentation description and the client is an MPEG-DASH client.

16. The system of claim 14, wherein the media presentation description is derived from HTTP Live Streaming playlists and the client is an HTTP Live Streaming client.

17. The system of claim 14, wherein the content model is a CMAF presentation.

18. The system of claim 14, wherein the method for bitrate-adaptation and content selection executed by the client includes the step of transposing the content model into a convex set includes a randomization operation.

19. The system of claim 14, wherein the method for bitrate-adaptation and content selection executed by the client includes initializing the default initialization parameters defined for Learn-to-Adapt.

20. The system of claim 14, wherein the method for bitrate-adaptation and content selection executed by the client includes a step of reading, from a memory, values associated with the said one or more constraint functions is followed by a prediction of the one or more constraint functions by a taylor expansion.

* * * * *